Feb. 7, 1933.  F. JACQUET  1,896,584
TRAILER VEHICLE
Filed April 10, 1931
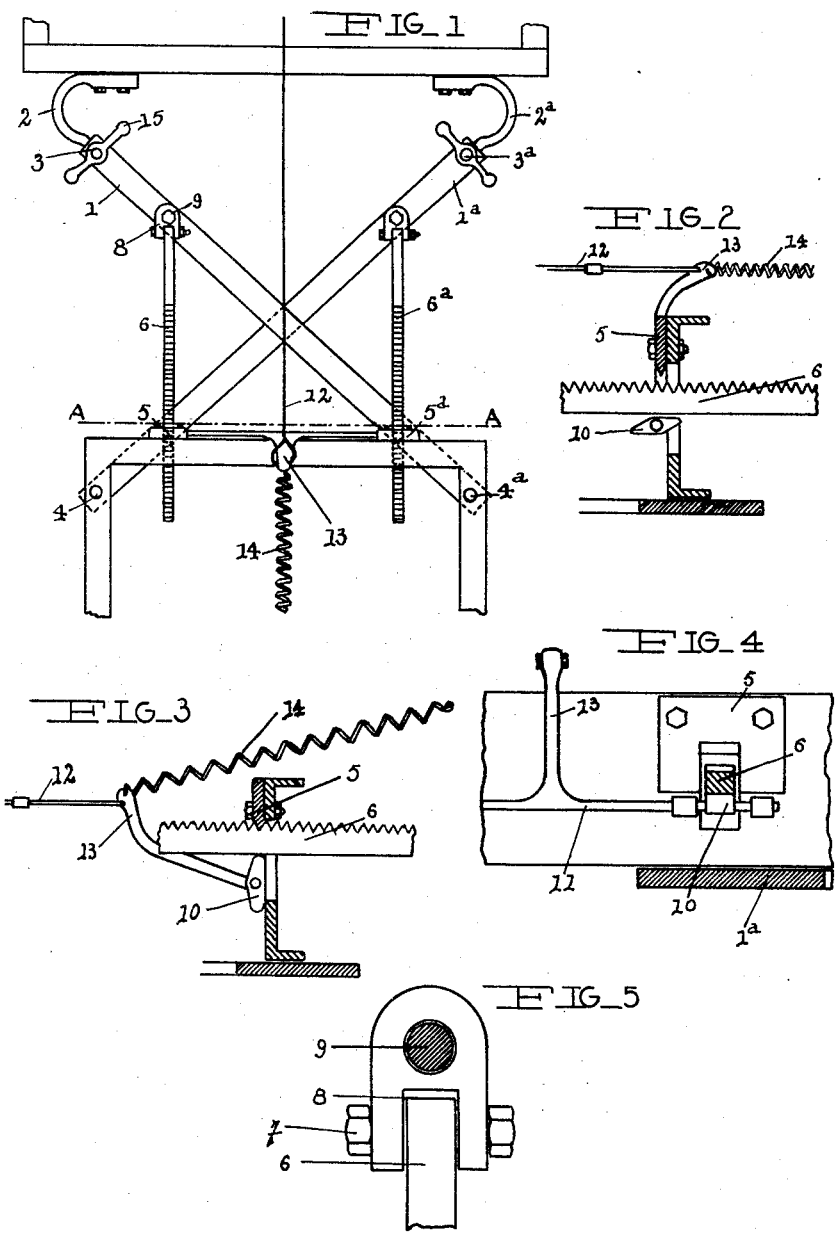
Inventor
Felicien Jacquet.
By William C. Linton.
Attorney.

Patented Feb. 7, 1933

1,896,584

UNITED STATES PATENT OFFICE

FÉLICIEN JACQUET, OF PARIS, FRANCE

TRAILER VEHICLE

Application filed April 10, 1931, Serial No. 529,169, and in France April 26, 1930.

My invention relates to improvements in trailer vehicles and is concerned more especially with a device for preventing movement of the trailer relative to the tractor vehicles in the direction of draught with a view to facilitating reverse travel of tractor and trailer vehicles.

This invention essentially consists in rendering the connecting system, which is actually articulated, non-deformable and this for any position which the trailer may assume with respect to the tractor vehicle. The trailer may thus be caused to follow the same path as the tractor vehicle without fear of sudden changes of direction such as could result from the accidental obstruction of a wheel by some obstacle.

The accompanying drawing, given by way of example, illustrates one construction of the device according to this invention.

Fig. 1 is a plan view of the draught connection,

Fig. 2 is a fragmentary vertical section of the locking system in the inoperative position, Fig. 3 is a similar view showing the parts in the locked position, Fig. 4 is a fragmentary vertical section taken on the line A—A of Fig. 1, and Fig. 5 is a detail view of the connection between the racks and the arms of the draught connection.

The hauling of the trailer, which may have two, three or four wheels, is affected in the usual manner by means of two crossed arms 1 and 1ª pivotally connected, on the one hand, to the chassis of the tractor by hooks 2 and 2ª and pins 3 and 3ª and, on the other hand, to the trailer by the pins 4 and 4ª (Fig. 1). According to the present invention the locking is brought about by two stop plates or teeth 5 and 5ª secured to the trailer and adapted to be engaged at the will of the driver with two rack bars or equivalent member 6 and 6ª pivotally connected with the arms 1 and 1ª. This pivotal connection (see Fig. 5) is effected in the following manner; the rack bar 6 oscillates about the pin 7 within the fork 8 which is capable of turning about the pin 9 secured on the arm 1.

For the purpose of causing the rack bar 6 and the locking tooth 5, (Fig. 2) to interengage, there is provided beneath the former a cam 10 keyed on a shaft 11 (Fig. 4) which can rotate under the action of an impulse given to a lever 13 manipulated from the driver's seat through the intermediary of a flexible cable 12. A spring 14 returns the parts to the inoperative position when the rearward travel is completed. The rack bars 6 and 6ª extend through the chassis of the trailer and are supported laterally by cheeks on the plates comprising the locking teeth 5 and 5ª (Fig. 4).

The operation of the arrangement is simple.

In order to turn while travelling rearwardly when the trailer has assumed the desired angle with respect to the tractor vehicle a pull is exerted on the cable 12 by means of any suitable device, the lever 13 moves forwardly and downwardly, the cams 10, following this movement, lift the rack bars 6 and 6ª and one of the inter-dental spaces on each of the latter engages with the corresponding plate or tooth 5 or 5ª (Fig. 3).

A rigid indeformable connection of the crossed arms 1 and 1ª is thus effected so that the tractor and trailer will maintain their relative positions during the whole of the turning movement. When this is completed the cable 12 is released, the spring 14 returns the lever 13 to its initial position, the cams 10 follow this movement and the rack bars 6 and 6ª fall back under the action of their own weight, disengaging from the teeth 5, 5ª (Fig. 2) and freeing the draught coupling.

The arms 1 and 1ª may be held on the pins 3 and 3ª for example by means of wing nuts 15 capable of being secured to the respective pins in order to prevent any unscrewing which might cause accidents.

The device according to the invention may be constructed for any type of trailer.

Variations may be made, according to circumstances, in the details of construction and assembly, as for example, instead of employing a rack bar comprising teeth there may be utilized a bar provided with a strip of rubber intended for locking purposes or any other suitable means.

I claim:

1. A trailer draft device comprising a pair of draft arms pivotally connected to the trailer, a rack carried by each of said arms and extended adjacent a portion of the trailer, and means on said portion of the trailer and engageable with said rack bars to lock the trailer in fixed relation to the draft arms.

2. A trailer draft device comprising a pair of draft arms pivotally connected to the trailer, a rack connected to each of said arms for universal movement thereon and extended adjacent a portion of the trailer, and means on said portion of the trailer and engageable with said rack bars to lock the trailer in fixed relation to the draft arms.

3. A trailer draft device comprising a pair of draft arms pivotally connected to the trailer, a rack carried by each of said arms and extended adjacent a portion of the trailer, and a pair of stop plates mounted on said portion of the trailer and extended in the path of said racks for engagement therewith to lock the trailer in fixed relation to the draft arms.

4. A trailer draft device comprising a pair of draft arms pivotally connected to the trailer, a rack movably carried by each of said arms and extended adjacent a portion of the trailer, a pair of stop plates mounted on said portion of the trailer and extended in the path of said rack bars for engagement therewith, and a cam movably supported adjacent said racks and movable to carry the latter in engagement with said plates to lock the trailer in fixed relation to the draft arms.

5. A trailer draft device comprising a pair of draft arms pivotally connected to the trailer, a rack bar movably carried by each of said arms and extended adjacent a portion of the trailer, a pair of stop plates mounted on said portion of the trailer and extended in the path of said rack bars for engagement therewith, a shaft rotatably supported on said portion of the trailer, a pair of cams secured to said shaft and disposed to bear upon said racks, and means to rotate said shaft and cause the cam to carry the rack bars in engagement with said stop plates to lock the trailer in fixed relation to the draft arms.

6. A trailer draft device comprising a draft connection pivoted to the trailer, a rack bar movably carried by said connection and extended adjacent a portion of the trailer, and means on said portion of the trailer and engageable with said rack bar to lock the trailer in fixed relation to the draft connection.

7. A trailer draft device comprising a draft connection pivoted to the trailer, a rack bar movably carried by said connection and extended adjacent a portion of the trailer, locking means mounted on said portion of the trailer and extended in the path of the rack bar for engagement therewith, and a cam movably supported adjacent said rack and movable to carry the latter in engagement with said locking means to lock the trailer in fixed relation to the draft connection.

8. A trailer draft device comprising a draft connection pivoted to the trailer, a rack bar movably carried by said connection and extended adjacent a portion of the trailer, locking means on said portion of the trailer and extended in the path of the rack bar for engagement therewith, a cam movably supported adjacent said rack and movable to carry the latter in engagement with said locking means to lock the trailer in fixed relation to the draft arms, and a remote control mechanism to move said cam.

In witness whereof I have hereunto set my hand.

FÉLICIEN JACQUET.